United States Patent
Daloz et al.

(10) Patent No.: US 8,315,377 B2
(45) Date of Patent: Nov. 20, 2012

(54) METHOD AND DEVICE FOR DISPATCHING AN ALERT MESSAGE IN A NETWORK

(75) Inventors: Claude Daloz, Lannion (FR); François Toutain, Louannec (FR); Vincent Teze, Landeda (FR)

(73) Assignee: France Telecom, Paris (FR)

( * ) Notice: Subject to any disclaimer, the term of this patent is extended or adjusted under 35 U.S.C. 154(b) by 443 days.

(21) Appl. No.: 12/301,076

(22) PCT Filed: May 16, 2007

(86) PCT No.: PCT/FR2007/051287
§ 371 (c)(1),
(2), (4) Date: Feb. 24, 2009

(87) PCT Pub. No.: WO2007/132131
PCT Pub. Date: Nov. 22, 2007

(65) Prior Publication Data
US 2009/0185668 A1    Jul. 23, 2009

(30) Foreign Application Priority Data
May 17, 2006 (FR) ...................... 06 51796

(51) Int. Cl.
*H04M 1/00* (2006.01)
(52) U.S. Cl. ............ 379/373.04; 379/376.01; 379/93.17
(58) Field of Classification Search ............. 379/373.01, 379/373.02, 373.03, 373.04, 374.01, 376.01, 379/93.17
See application file for complete search history.

(56) References Cited

U.S. PATENT DOCUMENTS

| | | | | |
|---|---|---|---|---|
| 7,844,262 | B2 * | 11/2010 | Diroo et al. | 455/418 |
| 2006/0148459 | A1 * | 7/2006 | Wolfman et al. | 455/415 |
| 2007/0064921 | A1 * | 3/2007 | Albukerk et al. | 379/373.02 |
| 2007/0121919 | A1 * | 5/2007 | Kay | 379/373.04 |
| 2007/0211872 | A1 * | 9/2007 | Cai et al. | 379/142.01 |
| 2008/0125149 | A1 * | 5/2008 | Terranova | 455/466 |
| 2010/0020957 | A1 * | 1/2010 | Reynolds et al. | 379/207.16 |

FOREIGN PATENT DOCUMENTS
WO    WO 03/036909 A1    5/2003

OTHER PUBLICATIONS

Camarillo et al., "Early Media and Ringing Tone Generation in the Session Initiation Protocol (SIP)," IETF Standard, Internet Engineering Task Force, IETF, pp. 1-14 (Dec. 2004).

Mahy, "Conveying Tones in the Session Initiation Protocol (SIP)," IEFT Standard-Working-Draft, Internet Engineering Task Force, IETF, No. 1, pp. 1-14 (Oct. 2003).

* cited by examiner

*Primary Examiner* — Olisa Anwah
(74) *Attorney, Agent, or Firm* — Drinker Biddle & Reath LLP

(57) ABSTRACT

This method for dispatching an alert message in a telecommunications network comprises a step (E20) of receiving a multimedia stream emitted by a calling device having emitted a call to a called device, and a step (E30) of transmitting to the called device, during the call setup phase, at least one part of the multimedia stream, which part can be restored, at least partially, by alert means of the called device.

12 Claims, 4 Drawing Sheets

METHOD AND DEVICE FOR DISPATCHING AN ALERT MESSAGE IN A NETWORK

CROSS-REFERENCE TO RELATED APPLICATIONS

This application is the U.S. national phase of the International Patent Application No. PCT/FR2007/051287 filed May 16, 2007, which claims the benefit of French Application No. 06 51796 filed May 17, 2006, the entire content of which is incorporated herein by reference.

BACKGROUND OF THE INVENTION

The invention pertains to the technical field of alert mechanisms which can be used in telecommunications devices.

Within the sense of this document, "alert mechanisms" relate to any mechanism making it possible to warn a user of the receipt of a call and in particular ring tones, vibrators, telltale lights, still-image or moving-image displays, alone or in combination.

DESCRIPTION OF THE PRIOR ART

Alert mechanisms for terminals which can be configured, by means of menus of the man-machine interface of these terminals, are already known. These are for example menus making it possible to download polyphonic ring tones from the Internet network, or to choose a sound message emitted by a computer on receiving an email.

The SIP (Session Initiation Protocol) protocol described by document RFC 3261 from the IETF (Internet Engineering Task Force) additionally offers a possibility according to which the ring tone of a called device can be chosen by the calling party.

For this purpose, the call initialization INVITE message defined by this protocol comprises an optional Alert-Info field in which it is possible to specify, by means of a URL (Uniform Resource Locator), the physical location, on the Internet network, of a ring tone audio file, for example in the ".wav" format.

For more details on this Alert-Info field, the person skilled in the may refer to document RFC 3960 from the IETF.

This mechanism lacks flexibility and interactivity, since it makes it necessary to record, in the network, the file of the ring tone, before initializing the call.

It will be noted, moreover, that this operation requires particular technical means, notably access to the Internet network, which are not necessarily provided by the calling device.

SUBJECT AND SUMMARY OF THE INVENTION

According to a first aspect, the invention relates to a method for dispatching an alert message in a telecommunications network, this method comprising a step of receiving a multimedia stream emitted by a calling device having emitted a call to a called device.

This method comprises a step of transmitting to the called device, during the call setup phase, at least one part of the multimedia stream, which part can be restored, at least partially, by alert means of the called device.

The invention therefore allows the calling device to emit a multimedia stream intended to be restored by the alert means of the called device, during the call setup phase.

It therefore involves a highly interactive alert message dispatching method, since it does not require the prior recording of a file on the network before call initialization.

In this document, the expression "multimedia stream" should be understood in the broad sense, since it relates in particular to voice, visual, audiovisual, polyphonic messages, of digital or analog type.

The invention therefore allows the calling party to define a ring tone, vibrations, images or a moving film intended to be restored at least partially by the alert means of the called device.

In a particular embodiment, the alert message dispatching method according to the invention comprises, in the event of detecting call pick-up by the called device, a step of setting up a bidirectional communication channel between the calling device and the called device.

In this embodiment, if the called device picks up the line, either automatically, or because its user "goes off-hook", a communication channel is set up between the calling party and the called party.

This characteristic therefore makes it possible to implement a conventional telephone answering machine mechanism in which the user of the called device can choose or not choose to pick up the call, as a function of the message restored by the alert means of his device.

In a particular embodiment of the invention, the multimedia stream emitted by the calling device transports a voice message.

Preferably, this voice message is a message dictated by the user of the calling device during the call setup phase.

The calling party can thus, in a very explicit manner, introduce himself and ask the user of the called device to pick up the call.

In another particular embodiment of the invention, the multimedia stream emitted by the calling device transports a video message.

In a particular embodiment of the invention, the dispatching method comprises a step of recording the multimedia stream.

This step finds a favored use when the invention is used in a messaging system, since the user of the called device can, in this case, subsequently relisten to the recorded message if he is absent or if he decides not to pick up the call while listening to the voice message during the call setup phase.

In a particular embodiment of the invention, the transmission of the multimedia stream to the called device is done in response to a request (for example of HTTP type—HyperText Transfer Protocol) emitted by the called device itself.

For this purpose, the multimedia stream emitted by the calling device is recorded in a buffer memory accessible by a message server, and a call setup request, a field of which comprises at least one parameter identifying the buffer memory, is dispatched to the called device, so that the message server is able to transmit at least one part of the multimedia stream to the called device on receiving a request comprising the parameter.

In a particular embodiment of the invention, this field is a field of the Alert-Info type such as defined by the SIP standard, the identifying parameter being expressed in the form of an indicator pointing to the buffer memory.

This indicator can in particular consist of an address, for example of URL type, or a hypertext link.

In a particular embodiment, the various steps of the alert message dispatching method are determined by computer program instructions.

Consequently, the invention is also aimed at a computer program on an information medium, this program being able to be implemented in an alert message dispatching device or more generally in a computer, this program comprising instructions suitable for implementing the steps of an alert message dispatching method such as described above.

This program can use any programming language, and be in the form of source code, object code, or code intermediate between source code and object code, such as in a partially compiled form, or in any other desirable form.

The invention is also aimed at an information medium readable by a computer, and comprising instructions of a computer program such as mentioned above.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium can be a transmissible medium such as an electrical or optical signal, which can be trunked via an electrical or optical cable, by radio or by other means. The program according to the invention can be in particular downloaded via a network of Internet type.

Alternatively, the information medium can be an integrated circuit into which the program is incorporated, the circuit being adapted to execute or to be used in the execution of the method in question.

The invention is also aimed at a platform device, able to be implemented by an operator in a telecommunications network, comprising means for receiving a multimedia stream emitted by a calling device having emitted a call to a called device. This platform device comprises means for transmitting to the called device, during the call setup phase, at least one part of the multimedia stream, which part can be restored at least partially, by alert means of the called device.

The invention is also aimed at a messaging system able to be implemented by an operator in a telecommunications network, comprising:
- a platform device comprising means for receiving a multimedia stream emitted by a calling device having emitted a call to a called device; and
- a message server able to access a buffer memory in which is recorded at least one part of the multimedia stream which can be restored at least partially by alert means of the called device;
- means for dispatching, to the called device, a call setup request, a field of which comprises at least one parameter identifying the buffer memory, so that the message server is able to transmit, during the call setup phase, the at least one part of the multimedia stream to the called device on receiving a request comprising the parameter.

The advantages and particular characteristics of the platform device of the messaging system according to the invention are identical to those of the alert message dispatching method already mentioned. They will therefore not be recalled here.

BRIEF DESCRIPTION OF THE DRAWINGS

Other characteristics and advantages of the present invention will emerge from the description given below, with reference to the appended drawings which illustrate an exemplary embodiment thereof devoid of any limiting character. In the figures.

DETAILED DESCRIPTION OF SEVERAL EMBODIMENTS

Figure 1A:
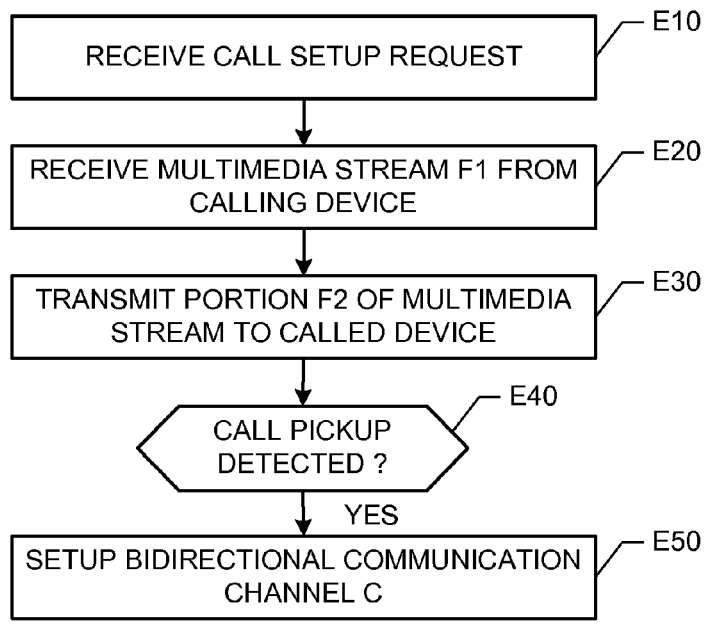
FIG. 1A represents, in flowchart form, the main steps of a method of dispatching alert messages in accordance with the invention in a first embodiment.

FIG. 1A represents, in flowchart form, the main steps of an alert message dispatching method in accordance with the invention in a first embodiment.

Figure 1B:
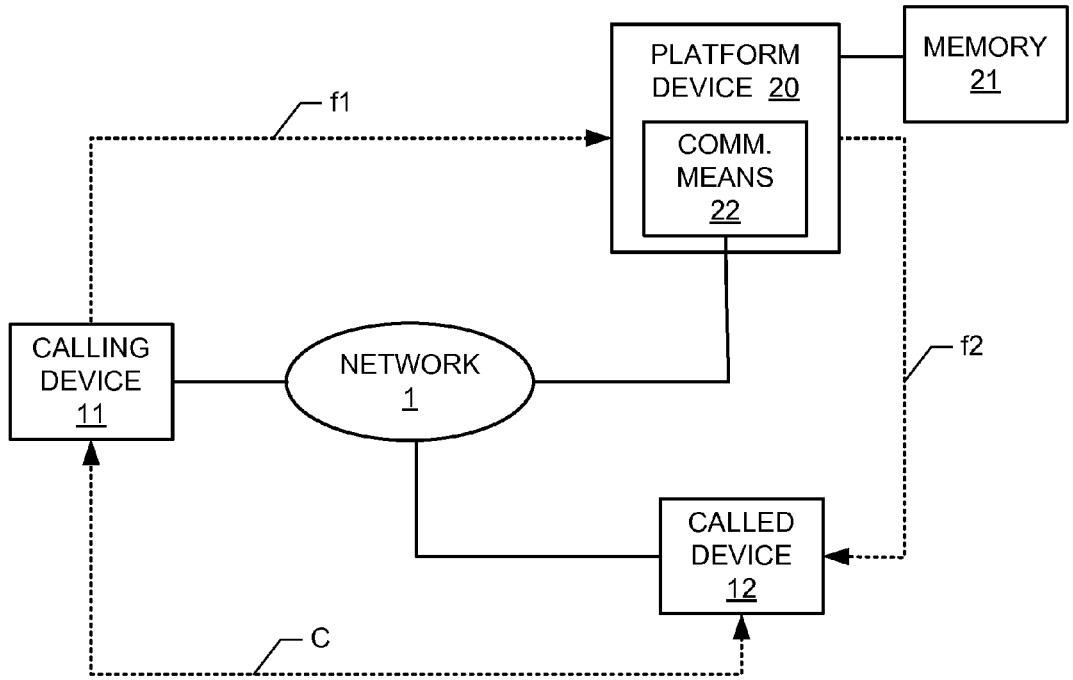
FIG. 1B represents a platform device in accordance with the invention suitable for implementing the method of FIG. 1A.

This method can be implemented by a platform device 20 in accordance with the invention represented, in its context, in FIG. 1B.

In the example described here, this platform device 20 has the hardware architecture of a conventional computer. It comprises in particular a processor, a read-only memory and a random-access memory (neither of which is represented) and communication means 22 by which it is linked to a telecommunications network 1.

The read-only memory of the platform device 20 comprises a computer program in accordance with the invention whose instructions allow the implementation of the flowchart of FIG. 1A.

We will assume, in this example, that the communication device 11 wishes to set up a communication with the communication device 12 and that, during the call setup phase, a video stream obtained by a camera of the calling device 11 is displayed on the screen of the called device 12.

We will assume that the calling device 11 emits a call setup request destined for the called device 12 and that this request is intercepted by the platform device 20 in accordance with the invention in the course of a first step E10 of the alert message dispatching method in accordance with the invention.

Then, the video images acquired by the camera of the calling device 11 are emitted, in a first multimedia stream f1, received by the communication means 22 of the platform device 20, in the course of a step E20. This video stream is stored, in the course of this same step, in a memory 21 of the platform device 20.

Simultaneously, that is to say right from interception of the call setup request, the platform device 20 emits a call setup request destined for the recipient device 12 chosen originally by the calling device 11.

The dispatching of this call initialization message participates, as is known, in the phase of call setup between the calling device 11 and the called device 12.

In the course of a step E30 of this call setup phase, the platform device 20 in accordance with the invention transmits, to the called device 12, a part of the video images that are acquired by the camera of the calling device 11 and are stored, as described previously, in the memory 21.

This video image stream, reference f2 in FIG. 1B, is a stream that is reduced with respect to the first stream f1, in such a way that the video images received by the called device 12 are compatible with the display means of this device.

Of course, as a variant, the second stream f2 may be identical to the first stream f1.

In the course of this same step E30, the display means of the called device 12, which constitute alert means within the sense of the invention, fully restore the multimedia stream f2 received from the platform device 20.

It is therefore understood that the user of the reception device 12 sees, on his screen, the scene acquired by the camera of the calling device 11.

In the example described here, it will be assumed that the communication device 12 is configured so that it picks up the line after a predetermined lag reckoned from the start of reception of this multimedia stream f2.

This line pick-up terminates the call setup phase between the calling device 11 and the called device 12.

This step results in the dispatching of a call acceptance message emitted by the called device 12 destined for the platform device 20 in accordance with the invention.

We will assume that the platform device 20 in accordance with the invention detects this call pick-up in the course of this same step E40.

In the exemplary embodiment described here, subsequent to this detection of call price, the platform device 20 sets up a bidirectional communication channel C between the calling device 11 and the called device 12 in the course of a step E50.

This bidirectional communication channel C makes it possible, as is known, to set up a telephone communication between the users of these two terminals.

Figure 2A:
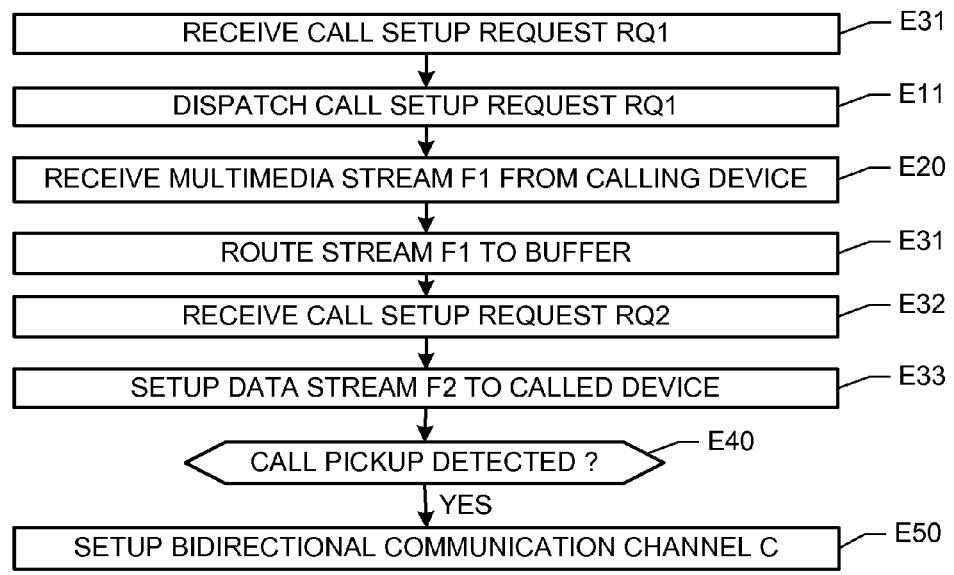
FIG. 2A represents, in flowchart form, the main steps of an alert message dispatching method in accordance with the invention in a second embodiment.
Figure 2B:
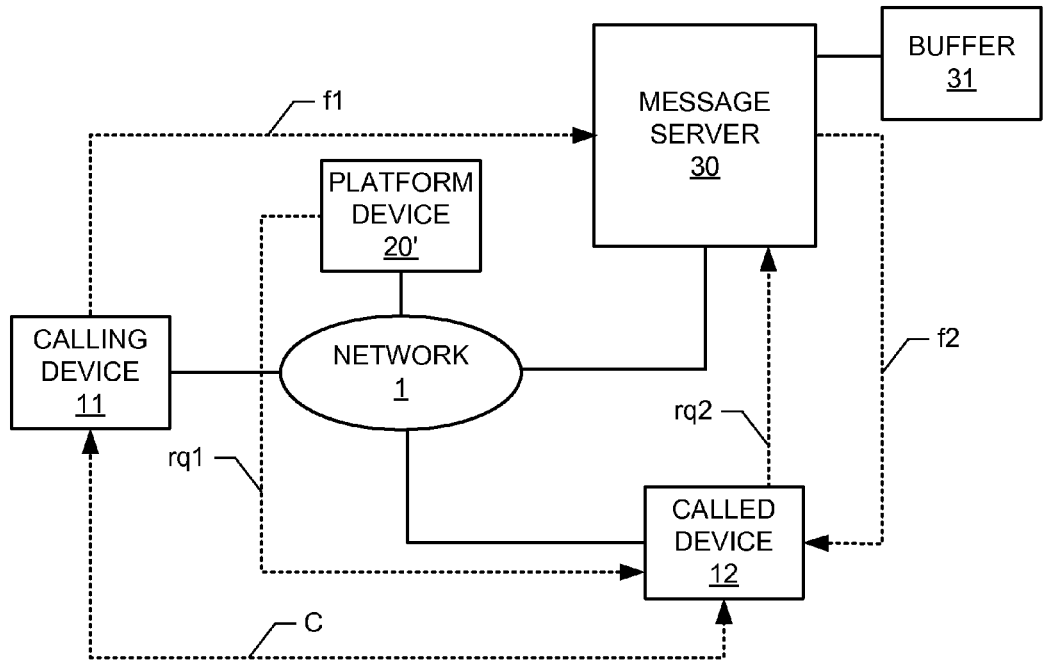
FIG. 2B represents a messaging system in accordance with the invention suitable for implementing the method of FIG. 2A.

We shall now describe, with reference to FIGS. 2A and 2B, a second embodiment of the invention.

This second embodiment corresponds to a messaging application.

FIG. 2A represents, in flowchart form, an alert message dispatching method in accordance with the invention in this second embodiment. It can be established by a messaging system in accordance with the invention represented, in its context, in FIG. 2B.

This messaging system is composed mainly of a platform device 20' and of a message server 30, these two items of equipment comprising, in this example, the hardware architecture of a conventional computer.

In the example of FIG. 2B, these two items of equipment are distinct. As a variant, they could consist of a single computer.

We will assume, as in the first embodiment, that the platform device 20' detects, in the course of a first step E10, a call setup request emitted by the calling device 11, destined for the called device 12.

This second embodiment corresponds to a messaging application.

On receiving this call initialization message, the platform device 20' dispatches, in the course of a step E11, a call setup request rq1 to the called communication device 12. This request rq1 possesses a field which comprises a URL pointing at a buffer memory 31 of the message server 30.

In this example, we will assume that the user of the calling device 11 emits a voice message intended to be reproduced by way of ring tone by the loudspeaker of the called device 12 during the call setup phase.

This voice message is emitted in the form of a multimedia stream f1, received by the platform device 20' in the course of a step E20.

Then, the multimedia stream f1 is routed by the platform device 20', to the buffer memory 31 of the message server 30, in the course of a step E31.

When the called device 12 receives the call setup request rq1, it emits, in the course of a step E32, a second request rq2 destined for the message server 30, to download the multimedia data stored in the buffer memory 31.

Thus, in the course of a step E33, a data stream f2 is set up between the message server 30 and the called device 12 wherein is conveyed the voice message emitted by the calling device 11 and buffered in the memory 31.

The voice message emitted by the user of the calling device 11 is therefore restored, with a slight shift due to storage thereof in the buffer memory 31, by the loudspeaker of the called device 12.

In this exemplary embodiment, the platform device 20' is capable of detecting, in the course of a step E40, line pick-up by the called device 12, for example by the intentional action of the user of this device, and to establish, in the course of a step E50, a bidirectional communication channel between the calling device 11 and the called device 12, referenced C.

Figure 3:
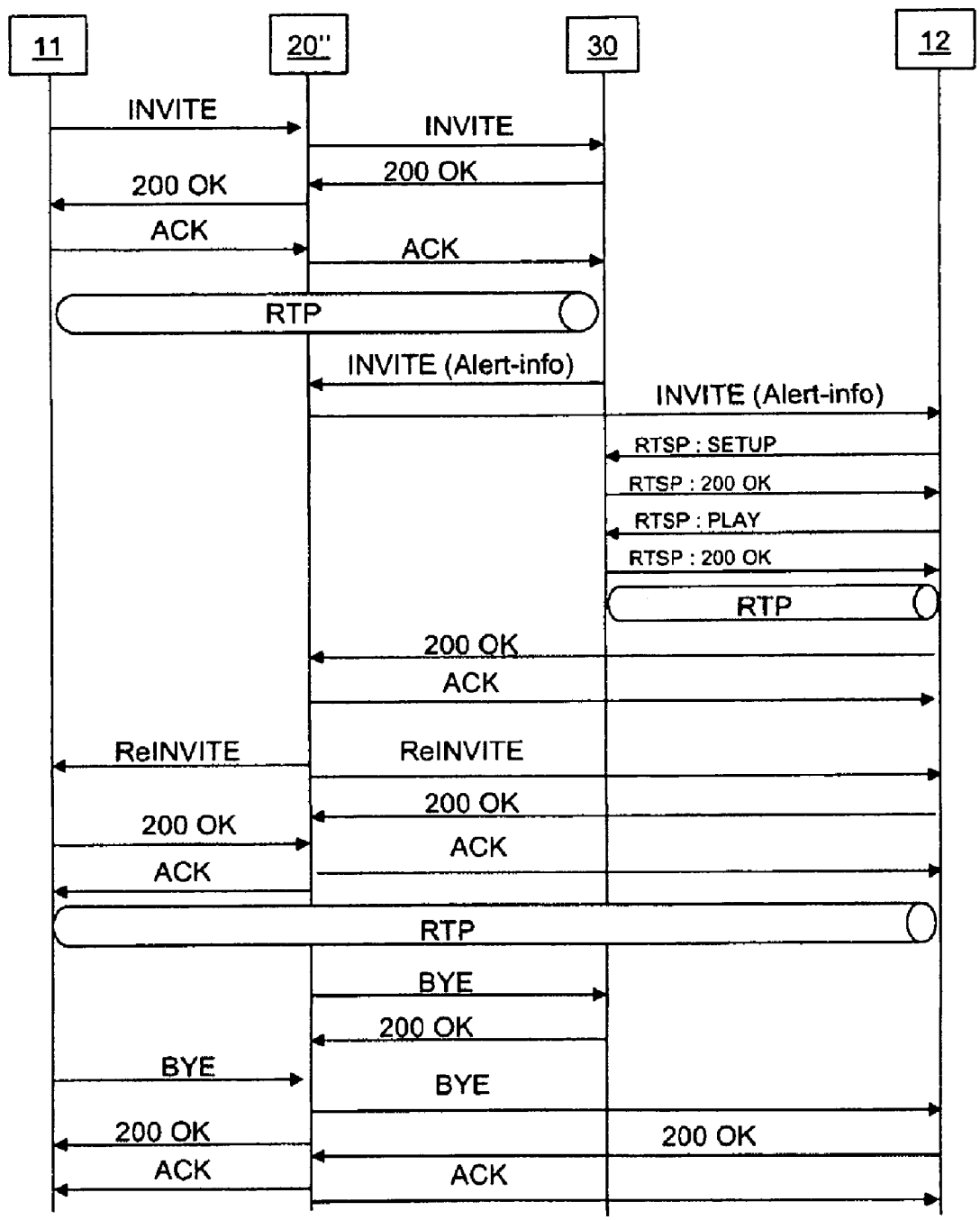
FIGS. 3 and 4 represent an alert message dispatching method in accordance with the invention in the context of the SIP protocol.

We shall now describe with reference to FIG. 3 an alert message dispatching method in accordance with the invention in the context of the SIP protocol.

In the course of a first step, the calling device 11 initiates a call setup to the called device 12.

As a consequence of a diversion to a messaging configured at the level of an SIP server 20", the call request is transferred to a voice box server 30 with which the communication is set up.

A traditional messaging service starts with invitation to leave a message.

In parallel, the voice box server 30 undertakes a call setup to the called device 12. This call setup travels via the SIP platform 20" which short-circuits the diversion to messaging.

During the step of leaving a message, the audio signal emitted by the calling device 11 is dispatched to the called device 12 in the form of a ring tone to be presented.

In this way, the user of the called device 12 can listen to the message left for his attention by the calling party 11, without any intervention, during the call setup phase.

He can also take his terminal off-hook and thus respond to the call request of the voice box server 30. In this case, the two half-calls are connected so that contact is established between the two terminals 11 and 12.

In order to simplify the description, we will assume that we are in the case of an automatic and immediate diversion to the voice box server 30.

We shall now describe this mechanism in greater detail.

First of all, the calling terminal 11 emits, in accordance with the SIP protocol, an INVITE call initialization message.

This message, received by the SIP platform, is transmitted to the voice box server 30.

We will assume that the voice box server 30 responds positively to this invitation, so that two SIP messages of type 200 OK are emitted, the first from the voice box server 30 to the SIP platform 20" and the second from this SIP platform 20" to the calling device 11.

We will also assume that these positive responses are acknowledged.

A communication channel is then set up in accordance with the RTP protocol (Real Time Protocol) to transport, in real time, the voice message emitted by the calling device 11 to the voice box server 30.

Thereafter, the voice box server 30 creates a call setup INVITE request transmitted to the called party 12 via the SIP service platform 20".

This request comprises a particular Alert-Info field which conveys the resource address of the data stream which will be used by the called terminal 12 as ring tone.

In accordance with the SIP standard, this field is expressed by a URL (Universal Resource Identifier), for example of the type: rtsp://mediaserver.operator.com/streaming.exe?session_id=E2T54G6.

In a known manner, the RTSP protocol (Real Time Streaming Protocol) such as defined in document RFC 2326 from the IETF allows the broadcasting of multimedia streams by message servers in streaming mode.

Simultaneously with the dispatching of this INVITE invitation message, the voice box server 30 creates or activates an RTSP server instance which places it on standby awaiting a request emanating from a client device.

When the INVITE invitation message is processed by the called terminal 12, the latter decodes the "Alert-Info" field and deduces therefrom the action of connection to the RTSP server.

This results in the RTSP requests of the type "SET UP" then "PLAY".

Once this connection has been effected, the voice message stored by the voice box server 30 is received in streaming mode, by an RTP data stream, and serves as ring tone on the called terminal 12.

The user of the called device can thus hear the message left by the calling party without seizing the line.

We will assume that the called party goes off-hook.

This causes, on the part of the service logic localized in the SIP service platform 20", the emission of two ReINVITE messages which convey modified session descriptions to take account of the new ends of the communication.

More precisely, the ReINVITE message transmitted to the calling device 11 transports the session description making it possible to open the data streams to the called party 12 and the ReINVITE message transmitted to the called device 12 transports the session description allowing it to open the data streams with the calling party 11.

Additionally, the same service control logic of the SIP platform 20" emits a BYE message ending the communication with the voice box server 30.

On completion of the communication between the calling party 11 and the called party 12, call termination is managed in a traditional and known manner.

Figure 4:
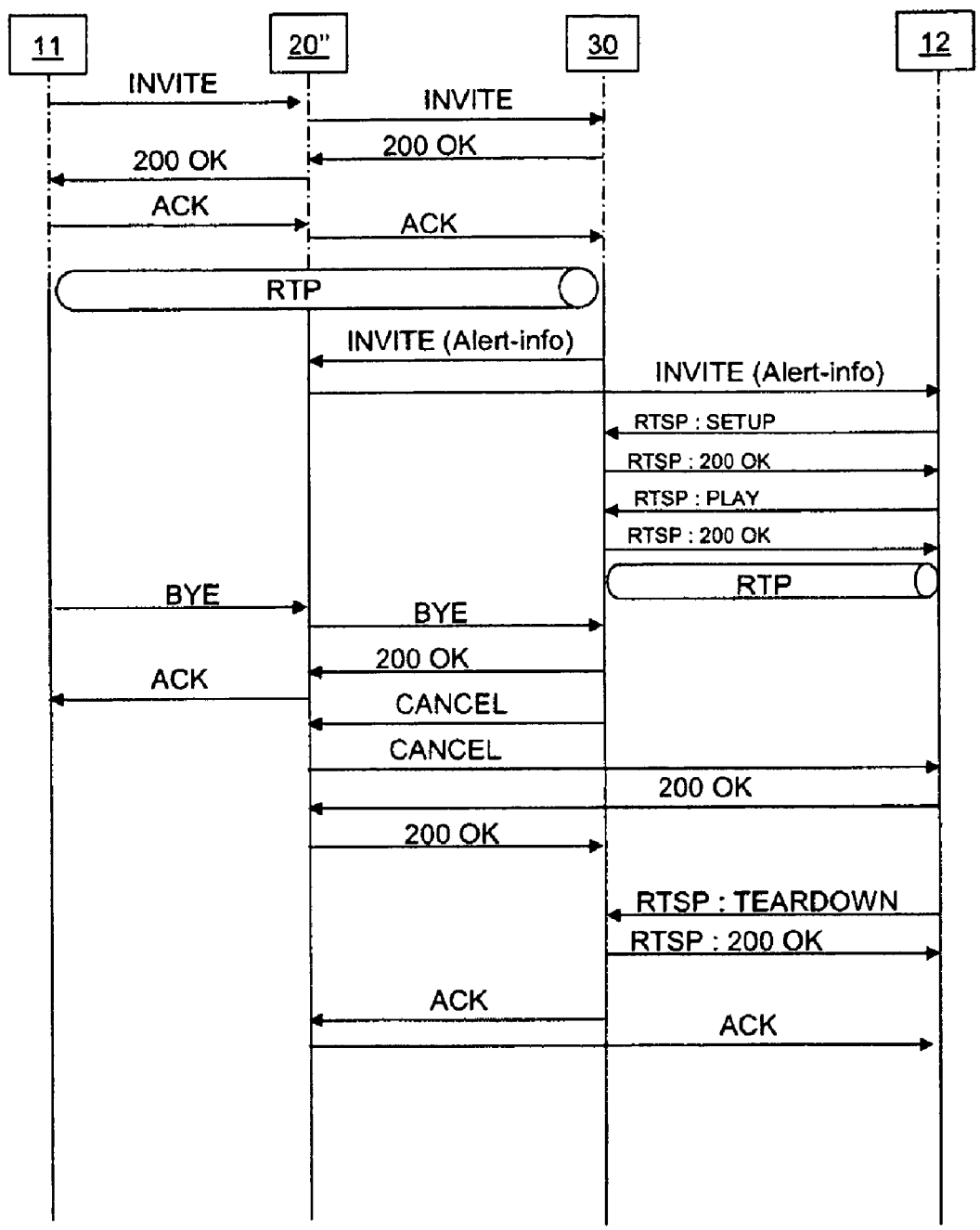

With reference to FIG. 4, we will assume that the called party does not go off-hook.

In the embodiment described here, the interaction between the calling party and the voice box server 30 continues until the whole message has been left, followed, in a known manner, by the calling device 11 going on-hook.

In the kinematics hereinafter, it is the calling party 11 which goes on-hook.

The call setup which was in progress between the voice box server 30 and the called device 12 is then interrupted by the traditional mechanism (CANCEL message).

The called terminal 12 stops ringing and ends the connection through which it received the audio data from the voice box server 30 with the aid of the TEARDOWN request of the RTSP protocol.

It should be noted that in the embodiments of the invention that are described here, the SIP messages "Trying" are not represented so as to simplify the flow charts of FIGS. 3 and 4 and the description of these charts.

The invention claimed is:

1. A method for dispatching an alert message in a telecommunications network, the method comprising:
   receiving a call setup request emitted by a calling device and destined for a called device;
   receiving and recording, in a memory, a data stream emitted by the calling device in response to receiving the call setup request;
   processing the data stream for compatibility with a display device of the called device;
   sending to the called device a second call setup request including a parameter identifying the processed data stream in the memory; and
   when a data stream request including the parameter is received from the called device, transmitting to the called device during a call setup phase at least part of the processed data stream, the at least part of the processed data stream being able to be restored, at least partially, by the called device.

2. The dispatching method as claimed in claim 1, further comprising, when a call pick-up by the called device is detected, setting up a bidirectional communication channel between the calling device and the called device.

3. The dispatching method as claimed in claim 1, wherein the data stream emitted by the calling device transports a voice message or a video message.

4. The dispatching method as claimed in claim 1, wherein the parameter is carried in a session initiation protocol Alert-Info field of the second call setup request, and the parameter represents a pointer to the data stream in the memory.

5. A messaging system in a telecommunications network, comprising:
   a platform device comprising means for receiving a data stream emitted by a calling device having initiated a call to a called device; and
   a message server comprising:
   means for recording in a memory at least part of the data stream that can be restored at least partially by the called device;
   means for processing the at least part of the data stream for compatibility with a display device of the called device;
   means for dispatching, to the called device, a call setup request having a field containing a link to the at least part of the data stream in the memory; and
   means for transmitting during a call setup phase the at least part of the data stream to the called device, when a real time streaming protocol (RTSP) SET UP message containing the link is received from the called device.

6. A non-transitory machine-readable recording medium storing instructions that, when executed, cause a machine to at least carry out the alert message dispatching method of claim 1.

7. An alerting method comprising:
   receiving at a called device from a communication server a second call setup request including a parameter identifying a data stream in a memory of the communication server, the data stream recorded by the communication server in response to a call setup request received at the communication server, and processed for compatibility with a display device of the called device;
   sending to the communication server a real time streaming protocol (RTSP) SET UP message including the parameter in response to the second call setup request;
   receiving from the communication server in a real time protocol (RTP) stream at least part of the data stream in response to the RTSP SET UP message; and
   restoring in the called device, at least partially, the at least part of the data stream to alert a user of the call setup request.

8. The alerting method as claimed in claim 7, further comprising, when a call pick-up is detected, establishing a bidirectional communication channel corresponding to the call setup request.

9. The alerting method as claimed in claim 7, wherein the data stream represents a voice message or a video message.

10. The alerting method as claimed in claim 7, wherein the parameter is carried in a session initiation protocol Alert-Info field of the second call setup request, and the parameter represents at least one of a pointer to the data stream in the memory or a link to the data stream.

11. A non-transitory machine-readable recording medium storing instructions that, when executed, cause a machine to at least carry out the alerting method of claim 7.

12. The dispatching method as claimed in claim 1, wherein the data stream request comprises a real time streaming protocol (RTSP) SET UP message.

* * * * *